(12) United States Patent
Zhao et al.

(10) Patent No.: US 8,961,038 B2
(45) Date of Patent: Feb. 24, 2015

(54) INTEGRATED AND SEALED OPTO-ELECTRONIC DEVICE ASSEMBLY

(71) Applicant: Hon Hai Precision Industry Co., Ltd., New Taipei (TW)

(72) Inventors: Jim Zhao, Irvine, CA (US); Yuan-Chieh Lin, Lake Forest, CA (US); An-Jen Yang, Irvine, CA (US); Pei Tsao, La Harbra, CA (US); Yin-Tse Kao, La Mirada, CA (US); Ashish Raheja, Foothill Ranch, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/160,483

(22) Filed: Jan. 21, 2014

(65) Prior Publication Data
US 2014/0133809 A1    May 15, 2014

Related U.S. Application Data

(63) Continuation of application No. 12/799,246, filed on Apr. 20, 2010, now Pat. No. 8,632,261.

(51) Int. Cl.
*G02B 6/36* (2006.01)
*G02B 6/42* (2006.01)
*G02B 6/38* (2006.01)

(52) U.S. Cl.
CPC .............. *G02B 6/428* (2013.01); *G02B 6/4201* (2013.01); *G02B 6/4292* (2013.01); *G02B 6/3885* (2013.01); *G02B 6/421* (2013.01); *G02B 6/4249* (2013.01)

USPC .................... 385/88; 385/14; 385/31; 385/89; 385/92; 385/93; 385/94; 385/131; 385/139

(58) Field of Classification Search
USPC .............. 385/14, 31, 88–89, 92–94, 131, 139
See application file for complete search history.

(56) References Cited

U.S. PATENT DOCUMENTS

| | | | |
|---|---|---|---|
| 6,454,470 B1 * | 9/2002 | Dwarkin et al. | 385/93 |
| 6,477,286 B1 * | 11/2002 | Ouchi | 385/14 |
| 7,263,248 B2 * | 8/2007 | Windover | 385/14 |
| 7,382,946 B2 * | 6/2008 | Oggioni et al. | 385/14 |
| 7,435,015 B2 | 10/2008 | Meadowcroft et al. | |
| 7,544,527 B2 * | 6/2009 | Benner et al. | 438/29 |
| 2003/0185484 A1 * | 10/2003 | Chakravorty et al. | 385/14 |
| 2006/0067064 A1 * | 3/2006 | Crews et al. | 361/761 |
| 2007/0258676 A1 * | 11/2007 | Windover | 385/14 |
| 2009/0087188 A1 | 4/2009 | Anderl et al. | |

* cited by examiner

*Primary Examiner* — Ryan Lepisto
*Assistant Examiner* — Guy Anderson
(74) *Attorney, Agent, or Firm* — Wei Te Chung; Ming Chieh Chang

(57) ABSTRACT

An opto-electronic device includes an optical engine module and an electrical socket. The optical engine module includes an optical engine, an optical transmission interface for coupling with an optical device and an electrical transmission interface, the electrical transmission interface having electrical pads. The electrical socket includes a plurality of BGA terminals, each terminal having a module-connecting end and a board-connecting end. The electrical transmission interface is removeably assembled in the electrical socket and the electrical pads contact the module-connecting ends of the electrical socket.

16 Claims, 6 Drawing Sheets

INTEGRATED AND SEALED OPTO-ELECTRONIC DEVICE ASSEMBLY

This patent application is a continuation application of U.S. patent application Ser. No. 12/799,246, filed on Apr. 20, 2010, now U.S. Pat. No. 8,632,261, entitled "INTEGRATED AND SEALED OPTO-ELECTRONIC DEVICE ASSEMBLY" which is assigned to the same assignee with this application.

BACKGROUND OF THE INVENTION

1. Field of the Invention

The present invention relates to opto-electronic device assemblies, and more specifically to the integrated and sealed packaging of opto-electronic devices which have optical cables, optoelectronic and electronic components in a case and mounted on a printed circuit board.

2. Description of Related Arts

Most computer and communication networks today rely on copper wire to transmit data between nodes in the network. Since the data transmitted over the copper wire and the data processed within the nodes are both represented in the form of electrical signals, the transfer of data at the node-copper wire interface is straight forward. Other than perhaps level shifts and signal amplification, no other signal processing is required for data transmitted over the copper wire to be decoded by the node. The drawback with using copper wire is its relatively narrower bandwidth. Copper's ability to transmit data is significantly limited compared to other mediums, such as fiber optics. Accordingly much of the computer and communication networks built today, including the Internet, are using fiber optic cable instead of copper wire.

With fiber optic cable, data is transmitted using light wave, rather than electrical signals. For example, a logical one (1) may be represented by a light pulse of a specific duration and a logical zero (0) may be represented by the absence of a light pulse for the same duration. In addition, it is also possible to transmit at the same time multiple colors of light over a single strand of optic fiber, with each color of light representing a distinct data stream. Since light is attenuated less in fiber than electrons traveling through copper, and multiple data streams can be transmitted at one time, the bandwidth of optic fiber is significantly greater than copper.

While fiber optic data transmission has proven very efficient, substantial problems have been encountered when applying these light signals to process data. Transferred data is typically stored in various locations before, during and after it is processed by a computer. Since there is currently no efficient technique to "store" these light packets of data, networks will likely continue to use fiber optics for transmitting data between nodes and silicon chips to process the data within the nodes for the foreseeable future. Building such networks requires opto-electronic transceivers, which connect optical transmission devices to electronic computing devices through devices that transform optical signals to electronic signals, and vice-versa.

Ideally, such opto-electronic transceivers should provide secured and reliable connections between the various devices and should be compact in size. Secured connections ensure that the individual devices do not disconnect and therefore cause a failure in the opto-electronic transformation process. Compactly sized transceiver modules allow a higher density of optical cables to be attached to an electronic printed circuit board, thereby increasing the bandwidth available to the computing system.

While the transceiver design adequately ensures a secure connection between optical and electronic devices, assembly of its individual sub-assemblies is mechanically complex.

In view of the foregoing, a simple and compact opto-electronic transceiver capable of providing secure connections between optical and electronic devices would be desirable.

SUMMARY OF THE INVENTION

Accordingly, an object of the present invention is to provide a sealed and integrated opto-electronic device assembly.

In order to achieve the above-mentioned object, an opto-electronic device intended to connect with an electrical board, comprises an optical engine module and an electrical socket. The optical engine module comprises an optical engine, an optical transmission interface for coupling with an optical device and an electrical transmission interface, the electrical transmission interface having electrical pads. The electrical socket comprises a plurality of ball grid array (BGA) terminals, each terminal having a module-connecting end and a board-connecting end. The electrical transmission interface is removeably assembled in the electrical socket and the electrical pads contact the module-connecting ends of the electrical socket.

Other advantages and novel features of the invention will become more apparent from the following detailed description of the present embodiment when taken in conjunction with the accompanying drawings

DETAILED DESCRIPTION OF THE PREFERRED EMBODIMENT

The present invention will now be described in detail with reference to a preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
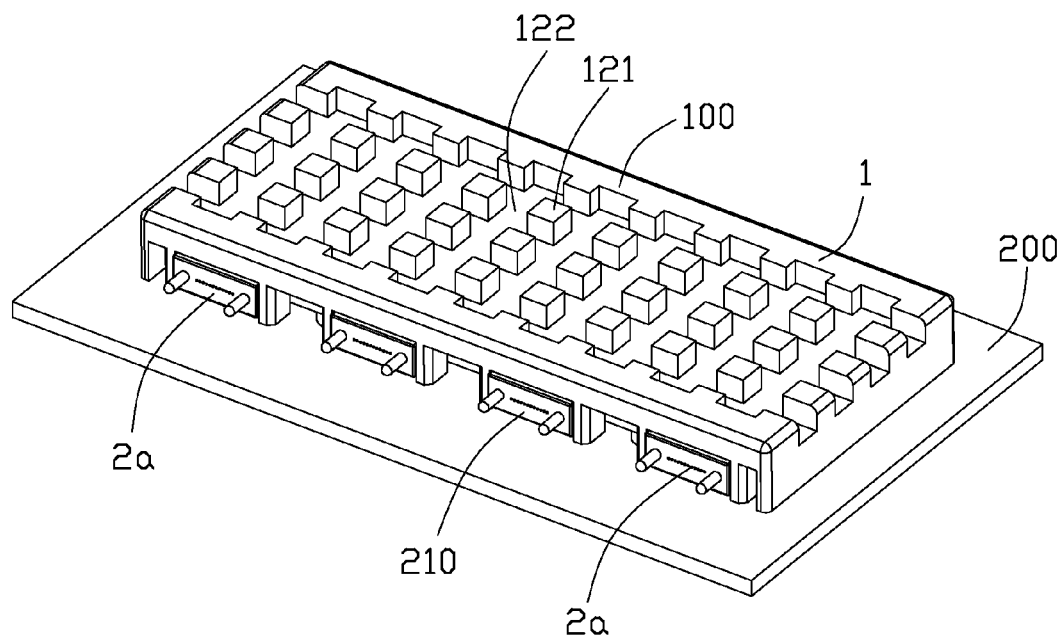
FIG. 1 is a perspective view of an opto-electronic device assembly mounted on a mother board in accordance with the present invention.
Figure 2:
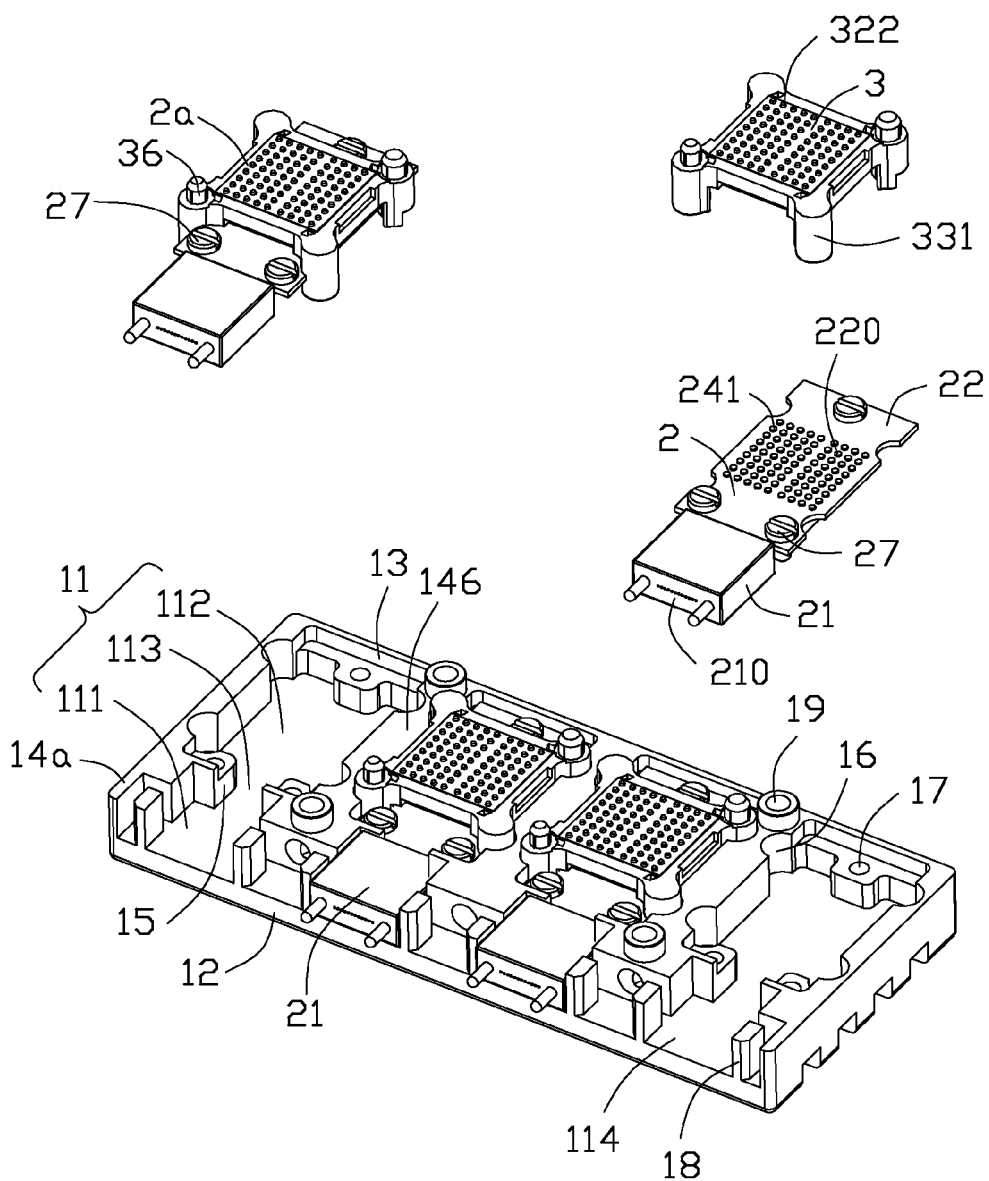
FIG. 2 is a partly exploded perspective view of then opto-electronic device assembly.

Referring now to FIGS. 1 and 2, the present invention is directed towards an opto-electronic device assembly 100 mounted on a printed circuit board named as a mother board 200, which has a metal case 1, and a plurality of opto-electronic devices 2a (there are four pieces in this embodiment). Each opto-electronic device 2a includes an optical engine module 2 and a BGA electrical socket 3. The optical engine modules 2 are removeably attached in the electrical sockets 3 respectively and then are placed in cavities 11 partitioned in the case 1. As a result, the case 1 cooperating with the mother board 200 seals the opto-electronic devices 2a therein, and only four optical transmission interfaces 210 are exposed to the front face of the case to prevent dust and moisture into those sensitive optical engine modules 2 and the electrical sockets 3.

Referring to FIG. 2, the case 1 made from metal material is formed by die-cast method and defines four same cavities 11 in this embodiment, each of which is surrounded by a planar top wall 12, a rear wall 13 and two end wall 14a. The four cavities 11 are partitioned from each other by three partitioning ribs 146 which are similar to and parallel to the end walls 14a. Please notes that the case is closed and only opens forward and downwards. Thus, the four cavities 11 only open forwards and downward which are arranged side by side. Each cavity 11 is divided into a front segment 111 and a rear segment 112 by two inward-protruding short walls 15 extending from adjacent partitioning ribs 146 or end walls 14a and every adjacent two cavities 11 communicates with each other by a narrow groove 113. A front part 21 of the optical engine module 2 is received in the front segment 111 and a rear part 22 of the optical engine modules 2 with the electrical socket 3 is received in the rear segment 112. As a result, the opto-electronic devices 2a are received and retained in the cavities 11 so as to form integrated multiple optical engine modules. The front part 21 completes the front opening of the case and the mother board covers the bottom of the case to seal the opto-electronic devices in the case. Hereinafter, the structure of optical engine module 2 and the electrical socket 3 and the assembly of the device 2a will be described.

Figure 3:
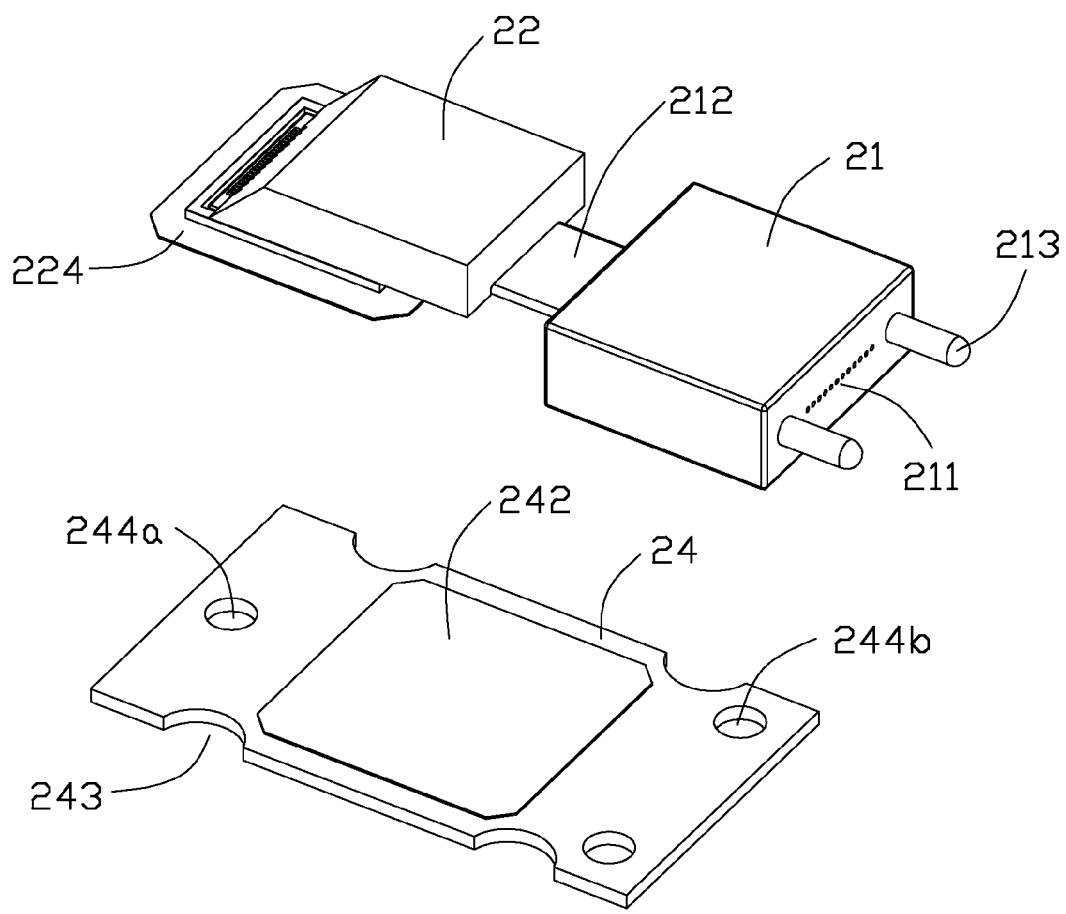
FIG. 3 is an exploded perspective view of an optical engine of the opto-electronic device assembly.
Figure 4:
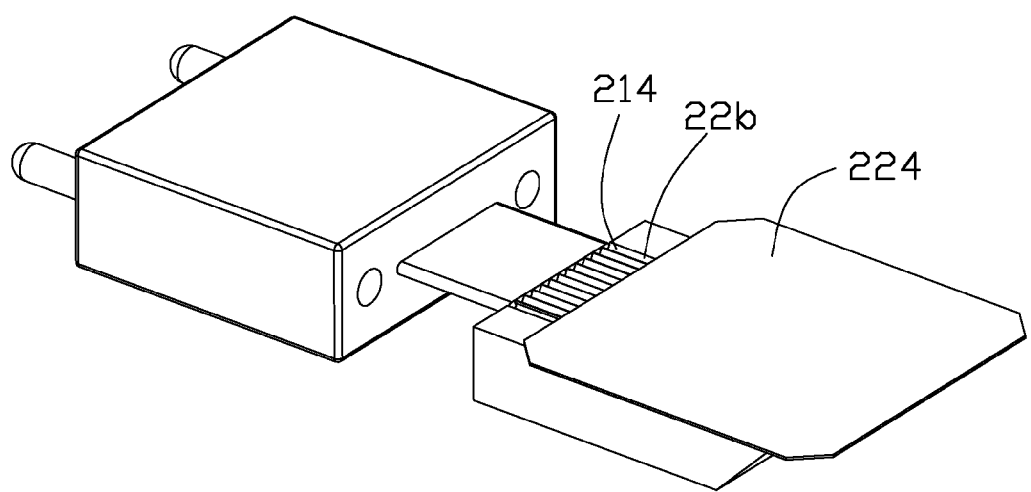
FIG. 4 is a perspective of the optical engine of FIG. 1 from a bottom view.

Referring to FIG. 3, the optical engine module 2 includes the optical cable module 21, the optical engine 22 and an electrical substrate 24. The optical cable module 21 includes multiple optical waveguides 211 embedded therein and coupled with the optical engine 22 by a flexible optical cable 212. The optical cable module 21 has a pair of guiding posts 213 projecting forwards beyond the front ends of the optical waveguides 211. The optical engine 22 is equipped with a light emission or a receive module and an IC package (not shown) so as to complete optic-to-electric or electrical-to-optic converting function. The optical cables ends 214 (as best shown in FIG. 4) are received and retained in the V shaped grooves 226 to hold the cable in the optical engine 22. The optical engine 22 is attached to the electrical substrate 24 to output electrical signals by a matrix of electrical pads 241 (labeled in FIG. 2) on the bottom face of the electrical substrate 24. In the preferring embodiment, the optical engine 22 is permanently attached to the electrical substrate 24 by a very low thermal expansion material 224. The electrical substrate 24 is provided with an electrical connecting area 242 in the centre thereof which is connecting with the optical engine 22. The electrical substrate 24 further has socket-retaining portions and case-retaining portions. The socket-retaining portions are in the form of four semicircle notches 243 respectively in longitudinal side of the electrical substrate 24. The case-retaining portions are in the form of three circle holes 244a, 244b, one of which 244a is located at the far end of the electrical substrate and two of which 244b are at the near end of the electrical substrate adjacent to the optical module 21. The flexible optical cable 212 also is seated on the electrical substrate 224. The optical engine 22, the optical cable module 21 and the electrical substrate 24 are formed as a unit as best shown in FIG. 2. The optical engine 22 is the control center of the assembly. The optical cable serves as a passive transmission path to other opto-electronic devices on other mother board and has the optical transmission interface 210 as labeled in FIG. 1. The electrical substrate 24 acts as an electrical transmission interface 220 as labeled in FIG. 2.

Figure 5:
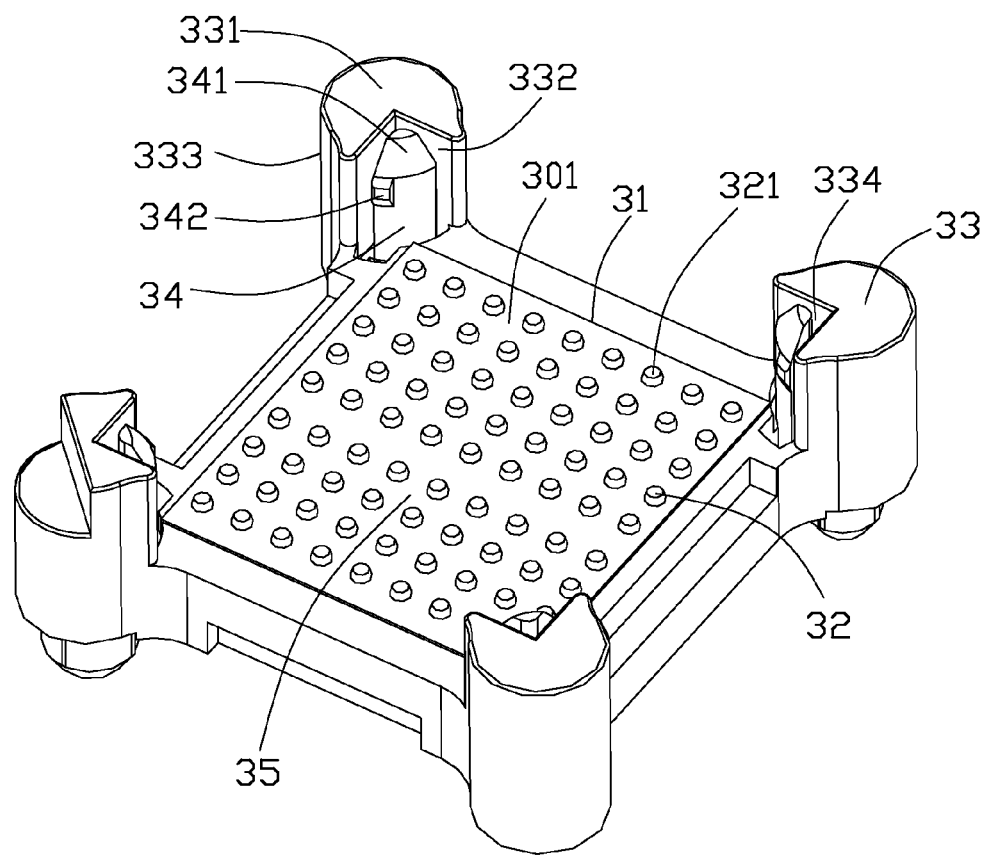
FIG. 5 is a perspective view of an electrical socket of the opto-electronic device assembly.

Referring to FIG. 5, the electrical socket 3 has a square insulating seat 31 retained with a plurality of ball grid array (BGA) terminals 32. Top ends 321 of the terminals are exposed to the top face 301 of the insulating seat and lower ends 322 (labeled in FIG. 2) are exposed to the lower face of the insulating seat. Four latching posts 33 extend upright form four corners of the insulating seat 31. Each latching post 33 has a three-forth cylinder 331 with a 90-degree recess 334. The recesses 334 are located at the diagonal lines of the insulating seat and face to each other. Thus, each latching post 32 has a right-angle inner surface 332 and a cylinder outer surface 333. A square receiving room 35 is thus defined and limited by said four right-angle inner surfaces 332. The cylinder outer faces 333 project outward from the insulating seat 31. A one-forth cylinder or retaining post 34 with a smaller radius than the three-forth cylinder 331, is unitarily hid in the recess 334. The one-forth cylinder 34 has a cone free top 341 and a bossing portion 342 projecting extending into the receiving room 35. Combined with FIG. 6, the electrical substrate 24 is pressed downward and the edges of the notches 226 go cross the bossing portions 342, and electrical substrate then are pressed by the bossing portions 342 on the top face thereof to prevent the electrical substrate from upturning. Thus the electrical substrate 24 is retained in the receiving room 35. Once the electrical substrate 24 is held, top ends 321 of the terminals of the electrical socket 3 which are attached to the corresponding electrical pads 241 of the electrical substrate 24, are pressed downwards to generate enough normal force to provide a decent, and reliable electrical transmission path. The outer movement of the latching posts 33 exerted by a user is facility to remove the optical engine module 2 from the receiving room 35.

Figure 6:
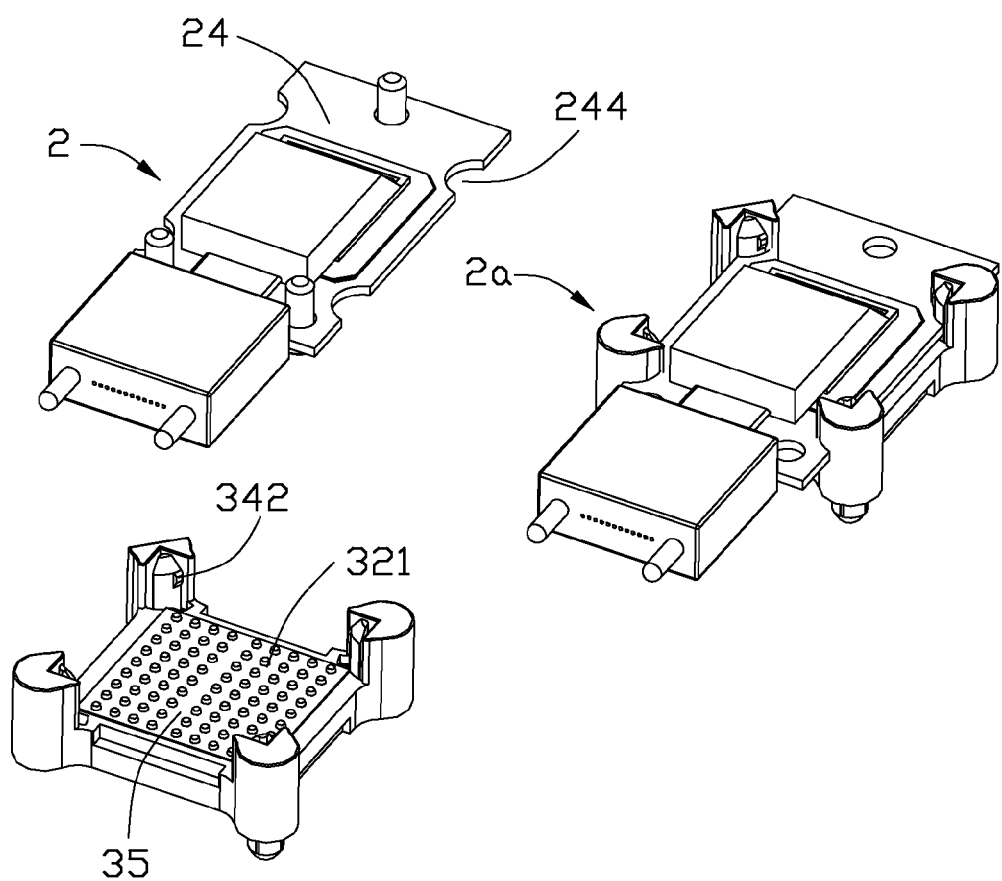
FIG. 6 is a perspective view of two opto-electronic devices of the opto-electronic device assembly.

Back to FIG. 2 and FIG. 6, the second segment 112 of the metal case 1 defines four notches 16 to receive three-forth cylinder 331 at opposite sidewalls thereof and three holes 17 at end walls thereof. Three bolts 27 go through the holes 244 of the electrical substrate 24 and into the holes of the case 1 to lock the optical engine module 2 in the second segment 112. A pair of deformable posts 18 is provided in the front of the first segment 111 and the distance between the posts is slightly smaller than the optical cable module 21 so that the optical cable module 21 is firmly clipped by the deformable posts. The bolts 27 can be inserted into the holes before or after the optical engine module 2 is assembled to the electrical socket 3. Two diagonal positioning posts 36 extending downward beyond the bottom face of the insulating seat 31 and two retaining posts 19 extending downward from the bottom of the partitioning rib 146, are inserted into corresponding holes on the PCB 200. The positioning posts 36 also benefit to guidance of the opto-electronic device 2a in alignment with the PCB when assembling. The retaining posts have threaded holes which are tightened onto the PCB by screws (not shown). The lower ends 322 of terminals of the electrical socket 3 are aligned with corresponding electrical pads (not shown) on the PCB 200. Please notes that the metal case 1 is a sturdy housing houses all components of the optical engine modules inside to prevent dust and moisture from entering those sensitive optoelectronic components once installed on the PCB and the assembling method provides a simple, easy, clean and reliable means to install and terminate the opto-electronic devices onto the PCB 200 without any additional messing methods such as soldering, welding, etc. Moreover, the metal case can pack more opto-electronic devices in the same space comparing to the loose pieces directly on the PCB.

As best shown in FIG. 1, the metal case 1 also performs as a heat sink to absorb and spread the heat, generated from the IC package, all over to dissipate to the air. The top face of the top wall 12 is recessed downwards to form a matrix of spaced blocks 121 and channels 122 between the spaced blocks. The metal case can also be attached to chassis grounds of the PCB 200 to provide EMI/RFI protection between the opto-electronic modules and the outside of the metal case 1. The partition ribs also performs as a shield to prevent EMI/RFI among the multiple opto-electronic devices.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An opto-electronic device intended to connect with an electrical board, comprising:
    an optical engine module comprising an optical engine, an optical transmission interface for coupling with an optical device and an electrical transmission interface, the electrical transmission interface having electrical pads; and
    an electrical socket comprising a plurality of terminals in matrix, each terminal having a module-connecting end and a board-connecting end;
    wherein the electrical transmission interface is removeably assembled in the electrical socket and the electrical pads contact with the module-connecting ends of terminals of the electrical socket;
    wherein the optical engine module comprises an optical cable module, the optical engine and an electrical substrate, the electrical pads are disposed on the electrical substrate functioned as the electrical transmission interface;
    wherein the electrical socket defines four latching posts at corns thereof, the electrical substrate defines two pairs of semicircle notches to be locked with the latching posts.

2. The opto-electronic device as described in claim 1, wherein each latching post defines an inner recess and an electrical-interface-receiving room is defined along inner sides of said recesses of the latching posts.

3. The opto-electronic device as described in claim 2, wherein a retaining post is hidden in the recess of the latching post and the retaining post has a bossing portion projecting to the electrical-interface-receiving room to retain the electrical substrate, at an upper end thereof.

4. The opto-electronic device as described in claim 3, wherein the latching post is in a shape of three-forth cylinder and the retaining post is in a shape of one-forth cylinder unitarily formed in the recess.

5. The opto-electronic device as described in claim 4, wherein the retaining post has a cone free top end.

6. The opto-electronic device as described in claim 5, wherein the retaining post has a smaller radius than the latching post.

7. An opto-electronic device assembly comprising:
    a case defining a plurality of cavities therein;
    a plurality of opto-electronic devices, each device including an optical transmission interface device and an electrical transmission interface device;
    a plurality of electrical sockets, each socket including an array of terminals, the electrical interface devices being assembled in the electrical sockets and electrically and mechanically connecting with the arrays of terminals respectively;
    wherein each opto-electronic device defines socket-retaining portions and case-retaining portions, the opto-electronic devices are fitly retained in the electrical sockets through the socket-retaining portions, the opto-electronic devices together with the electrical sockets are fitly retained in the cavities of the case through the case-retaining portions, the electrical sockets define PCB-positioning posts.

8. The opto-electronic device assembly as described in claim 7, wherein the case-retaining portions are located at outside of the electrical sockets.

9. The opto-electronic device assembly as described in claim 8, wherein the socket-retaining portions of each opto-electronic device comprise latching posts integrally formed with the electrical socket and notches disposed at the electrical interface device, the latching posts are locked in the notches.

10. The opto-electronic device assembly as described in claim 9, wherein the case-retaining portions of each opto-electronic device comprise holes disposed at outsides of the electrical interface device and bolts running through the holes and screwing with the case.

11. The opto-electronic device assembly as described in claim 10, wherein each cavity defines four notches to receive the latching posts of the electrical socket.

12. An opto-electronic device assembly comprising:
    an electrical socket defining an upward receiving room and a downward mounting face adapted to be mounted to a main board, a plurality of conductive terminals having opposite ends exposed to said receiving room and said mounting face; and
    an optical engine module including an optical engine horizontally linked with an optical cable module and vertically linked with an electrical substrate; wherein said electrical substrate is configured to be vertically assembled into and retained within the receiving room and electrically connected to the corresponding terminals;
    a case in which said socket and optical engine module are received, wherein the electrical substrate is fastened to an interior face of the case;
    wherein the socket includes a plurality of posts each extending into the cavity to be engaged with the electrical substrate and the case.

13. The opto-electronic device assembly as claimed in claim 12, wherein said optical engine is received in the receiving room.

14. The opto-electronic device assembly as claimed in claim 12, wherein each of said posts further extends downwardly away from the cavity to be adapted to be engaged with the main board.

15. The opto-electronic device assembly as claimed in claim 12, wherein a portion of the optical cable module extends forward beyond the case.

16. The opto-electronic device assembly as claimed in claim 12, wherein said case defines means for mounting upon the main board.

* * * * *